June 11, 1935.  D. H. MITCHELL  2,004,918
CONTROL DEVICE
Filed Nov. 10, 1932   3 Sheets-Sheet 1
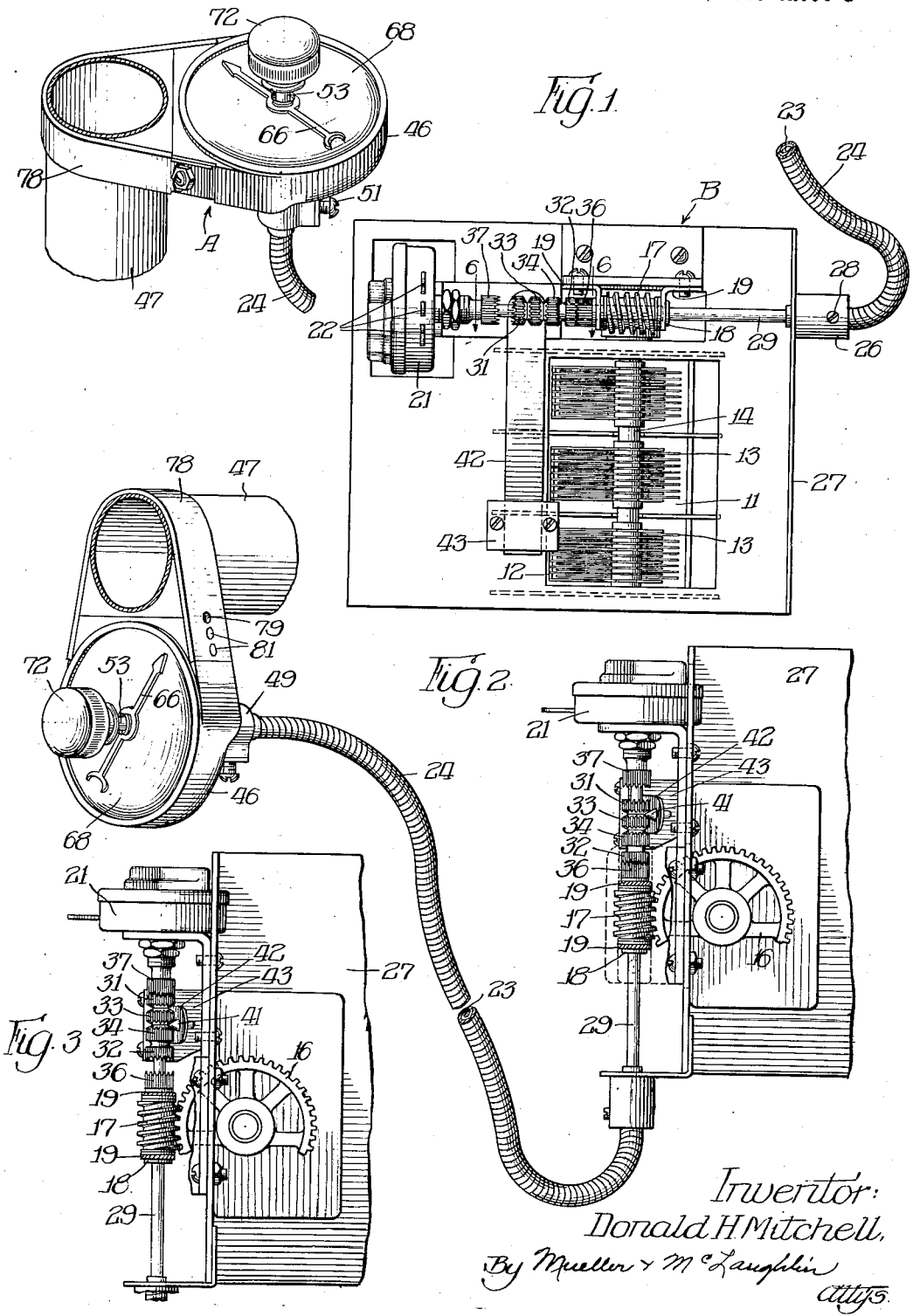

June 11, 1935.　　D. H. MITCHELL　　2,004,918
CONTROL DEVICE
Filed Nov. 10, 1932　　3 Sheets-Sheet 2

Inventor:
Donald H. Mitchell,
By Mueller & McLaughlin
attys

June 11, 1935.  D. H. MITCHELL  2,004,918
CONTROL DEVICE
Filed Nov. 10, 1932   3 Sheets-Sheet 3
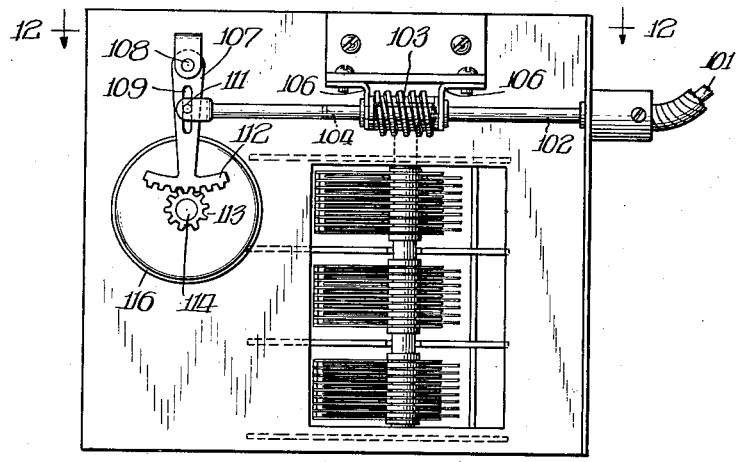
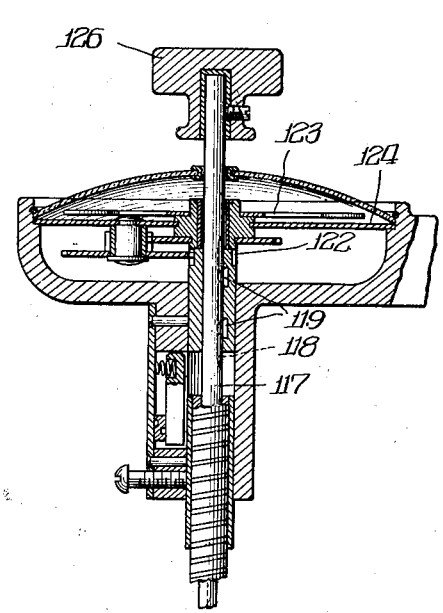
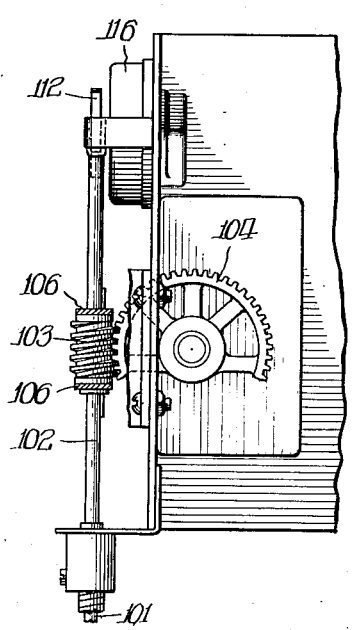
Inventor:
Donald H. Mitchell,
By Mueller & McLaughlin
attys.

Patented June 11, 1935

2,004,918

UNITED STATES PATENT OFFICE 2,004,918

CONTROL DEVICE

Donald H. Mitchell, Chicago, Ill., assignor to Galvin Manufacturing Corporation, Chicago, Ill., a corporation of Illinois Application November 10, 1932, Serial No. 642,061

13 Claims. (Cl. 250—20)

My invention relates in general to remote control devices and more in particular to a remote control device adapted for controlling a radio receiver.

Although not confined to such use, my invention will be described as applied to an automobile radio receiver. In this type of receiver, it is customary to mount the chassis in a suitable container supported within the automobile, usually on the bulk head separating the engine compartment from the passenger compartment, and to provide a remote control mechanism secured usually on the automobile steering post. In the usual type of installation, this remote control device is somewhat bulky because as a rule it includes in addition to the means for controlling the tuning mechanism (variable condensers, for example) a switch for turning off the current running to the receiver as well as a volume control mechanism. In other words, the main circuit switch is carried on the steering post as well as the rheostat which controls the voltage running to the tube elements. This arrangement is objectionable not only because it involves carrying considerable mechanism on the steering post, but also because it requires running several wires between the receiver and the remote control device and these wires according to the present practice must be shielded carefully to avoid stray pick up on them.

The principal object of my present invention is to avoid the objections hereinabove outlined.

Another object is to control a radio receiver at a distance by employing only a single flexible shaft connection between the remote control device and the radio receiver.

Another object is the provision of a simple, compact, and easily operated remote control device.

Another object is to control a tuning mechanism and voltage control device by means of a single flexible shaft.

According to the main features of the invention, I support a flexible shaft to permit a limited end or longitudinal movement thereof as well as the usual rotary movement thereof. By moving the cable longitudinally, I selectively engage either one of a pair of adjustable devices, utilizing a pair of clutch members in connection with each device. In my present embodiment I operate a rheostat and switch when the cable is in one position and tune a radio receiver by adjusting the plates of a variable condenser when the cable is in another position.

Other objects and features of the invention will be apparent from a consideration of the following detailed description taken with the accompanying drawings, wherein Fig. 1 is a view partly in plan and partly in perspective with part of the cable broken away to conserve space;

Fig. 2 is also a fragmentary view with a portion of a radio receiver shown in elevation and the remote control device in perspective, looking at a slightly different angle;

Fig. 3 is an end view of a portion of the radio receiver similar to Fig. 2 but with the parts shown in a different position;

Fig. 11 is a plan view showing a modification of the radio set control;

Fig. 12 is an elevational view partly in section, looking along the line 12—12 of Fig. 11; and Fig. 13 is a vertical sectional view showing the control end of the embodiment shown in Figs. 11 and 12.

Figure 4:
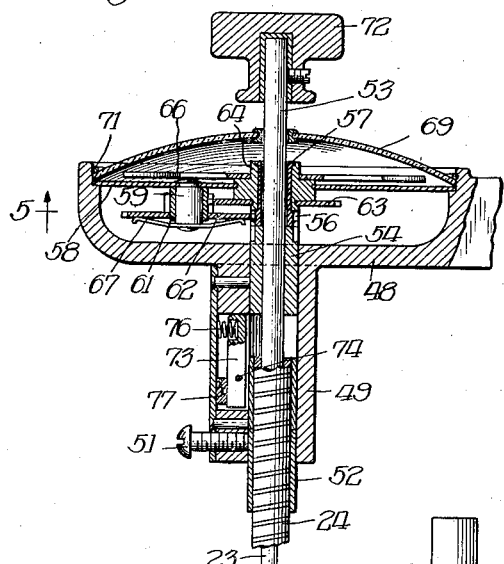
Fig. 4 is a sectional view taken longitudinally through the control end of the flexible shaft showing the mechanism associated therewith.

Referring now to the drawings, one embodiment of my invention, as illustrated particularly in Figs. 1 and 2, includes a remote control device A and the device B which is controlled. Each of these portions of the invention will be described separately in order that the relation between them may be established.

The device indicated generally by the reference character B is shown as part of a radio receiving set. Inasmuch as the present invention does not concern itself with the entire set, the major portion thereof is omitted in the drawings.

The portion of the radio shown includes a variable condenser 11 having stator plates 12 and rotor plates 13 secured to a rotor shaft 14. The rotor shaft is provided with a gear segment 16, in the present case, a suitable type of gear for meshing with a worm 17 carried on a hollow shaft 18 journalled in bracket members 19.

I also show a volume control device 21. This control device may be any electric control means normal to any type of radio set receiver.

In the present invention, I utilize a combination device including a rheostat of the usual type including a resistance winding and contact arm which at one extreme position operates a switch to control the entire current supply to the set. This is a standard piece of equipment and the details thereof are not shown. A number of contacts 22 are provided for connecting the electric control device 21 into the circuit.

Both the electrical control device 21 and the variable condenser 11 are operated from a single flexible shaft 23 provided with a sheath 24. The end of the sheath is anchored in a tubular projection 26 supported at the side of the container 27 by means of a set screw 28. The flexible shaft, itself, is suitably connected to a shaft 29 which extends through the hollow shaft 18 as a bearing.

Figure 6:
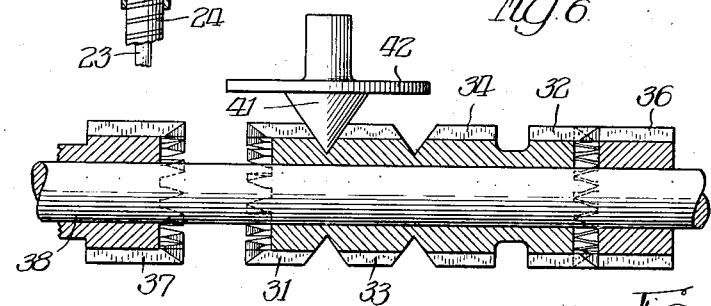
Fig. 6 is an enlarged fragmentary sectional view taken on the line 6—6 of Fig. 1.

Keyed to the shaft 29 is a clutch assembly including clutch members 31 and 32 and a pair of ratchet members 33 and 34, the function of which will be pointed out hereinafter. The clutch member 32 is adapted to engage a clutch member 36 carried on the hollow shaft 18, while the clutch member 31 is adapted to engage a clutch member 37 carried on a shaft 38 (Fig. 6) which connects to the operable portion of the electrical control device 21. The four clutch members employed are in the embodiment shown constructed substantially as gears, the ends of which are undercut to provide projecting clutch faces, one for each gear tooth. It will be understood, of course, that other types of clutch members may be employed. The construction illustrated has an advantage, however, in providing for clutch engagement at substantially any position. It should be noted that the clutch projections are pointed to facilitate engagement. By imparting end movement to the flexible shaft or cable 23, either pair of clutch members may be engaged whereby to operate either the condenser 11 or the control device 21.

Returning now to the two ratchet members 33 and 34, these are adapted to permit holding the entire assembly including the movable clutch members in the position to which they have been adjusted. A pawl 41 is supported on a flat spring 42 secured to the frame at 43. The pawl 41 being pointed and being urged by the spring toward the center of the shaft on which the two ratchet members are supported will readily engage in the V-shaped slot at the sides of these members to prevent unintentional or accidental movement of the clutch carrying assembly. This pawl engages on either side of the ratchet member 33, one V-shaped slot being between this member and the movable clutch member 31 and the other V-shaped slot being between the members 33 and 34. These are structural features built into the present embodiment, but it is obvious that any detent mechanism may be employed to provide a certain amount of resistance to the movement of the shaft 29.

The ratchet member 33 is also provided with teeth and when the assembly is shifted longitudinally the end of the spring pressed pawl passes between the teeth. This serves two useful purposes. In the first place, it tends to line up the two clutch members and, secondly, if the end movement has not been sufficient to engage the clutch members, one rotary movement is given to the shaft 29, the pawl will convert the rotor movement into a force longitudinally applied and complete the engagement of the clutch members. As will be pointed out, an indicator is provided for showing the frequency to which the receiver is tuned, and accordingly it is important that no movement be permitted which would allow the controlled end of the device to get out of synchronism with the controlling end.

The opposite end of the flexible shaft 23 extends to a frame 46 carried on the steering post column 47. This frame includes a housing 48 and a tubular bottom extension 49 into which the sheath 24 extends, in which it is secured by a screw 51. A sleeve 52 surrounds the sheath at the point of attachment.

The flexible shaft 23 terminates in a shaft 53. A clutch member 54 is secured to the shaft 53 within the tubular extension 49 and projects up into the housing 48. This clutch member 54 has clutch projections on its upper face similar to the clutch projections described in the controlled end of the device. These clutch projections are adapted to engage between correspondingly pitched teeth on a pinion 56. This pinion has an extension 57 in the form of a sleeve which extends up around the shaft 53. A diaphram 58 is supported on an annular shoulder in the upper portion of the housing and carries a stud 59 on which a sleeve gear 61 is journaled. This sleeve gear carries a larger gear 62 which meshes with the pinion 56 and in turn meshes with a gear 63 carried on a hub 64. This hub extends through the diaphram 58 and carries a pointer 66. Since the shaft 53 extends through the sleeve 57, there will at all times be a slight amount of friction which will tend to turn this sleeve and the gear 56, even though the clutch member 54 is not in engagement with the gear. To prevent any turning movement, I provide a spring washer or spider 67 secured on the bottom of stud 59 and frictionally engaging the gear 62. Enough friction is imparted to the gear 62 at this point to overcome any possible tendency for the gear 56 to turn due to friction between this gear and the shaft 53.

The diaphragm 58 has its upper surface finished as a dial 68 so that the frequency to which the receiver is tuned will be indicated by the portion of the dial which the pointer indicates. A transparent cover plate 69 is provided over the dial, and this cover plate is secured in position by any suitable means, for example, a spring wire retaining member 71 which engages in an annular groove around the top of the housing. The shaft 53 projects through the cover plate and at its top is provided with a knob 72 of a conventional type.

For locking the radio set, I provide a locking member 73 pivoted at 74 and urged in a position to engage under the member 54 by a spring 76. A key 77 engages in a keyway below the pivot 74 so that when in position it will hold the locking member 73 against the action of spring 76 as shown in Fig. 4 and prevent movement of the locking member under the clutch member 54. The manner in which this device is used for locking the radio set will be shown when the operation as a whole is considered.

Figure 9:
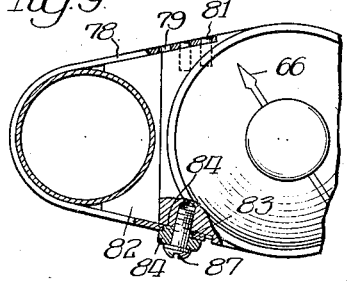
Fig. 9 is a fragmentary plan view partly in section showing the manner in which the remote control mechanism housing is secured to an automobile steering post.
Figure 10:
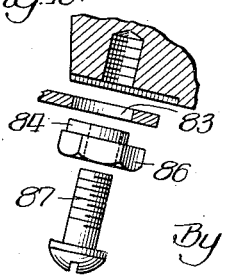
Fig. 10 is an enlarged separated fragmentary sectional view showing a feature illustrated in Fig. 9.

In connection with my remote control device, I provide improved means for mounting the frame structure 46 onto the steering post 47. Referring to Fig. 9, I utilize a semi-flexible strap 78 which is provided with a plurality of holes 79 at one end adapted to engage pins 81 which extend into the frame 46 but project outwardly a sufficient distance to engage in the holes 79. The frame has an extension 82 arcuate on its end to fit around a portion of the steering post. The strap 78 completes the encircling of the post and is fastened by a mechanism which permits sufficient adjustment of the strap length to pull it tightly about the post and make a firm connection.

The opposite end of the strap 78 is provided with a relatively large opening 83 into which an eccentric 84 imparts the necessary tension to the strap. Holding the nut in this position, the screw 87 is then tightened to hold the nut in place and a firm connection has been established. It will be understood that the extensions 82 may have different curvatures to fit different steering posts, so that this will be the only portion of the device which will have to be made special for different sized posts. Even here, however, the curvature does not have to correspond exactly with the curvature of the post in order to make a tight connection.

Figure 5:
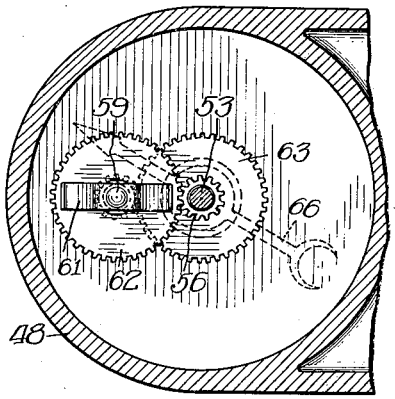
Fig. 5 is a sectional view looking upwardly taken on the line 5—5 of Fig. 4.

Referring now to the operation of the remote control device. In the position which the parts occupy in Figs. 1 and 2, the clutch members 32 and 36 are engaged so as to turn the worm 17 and adjust the position of the rotor plates of the variable condensers. This is the position in which the device is left when locked by the owner. The corresponding position of the controlling end of the device shown in Fig. 4 illustrates that when the key 77 is removed the locking member 73 will drop into place and prevent any endwise movement of the flexible shaft. It will be understood, of course, that the receiver in the meantime has been shut off by controlling the device 21. In order to turn the device 21, the knob 72 is pushed downwardly until the clutch member 31 engages the clutch member 37. The knob is then turned and according to the usual construction of the device 21, as described, the first movement is to turn on the main switch which supplies power to the set and thereafter continued movement merely increases the volume. At this time, the clutch member 54 (Fig. 5) has been taken out of engagement with the pinion 56 which also functions as a clutch member so that the indicator or hand 66 is not turned.

Now assuming that the radio set is to be tuned to a station, the knob 72 is pulled upwardly, thus moving the entire flexible shaft and restoring the parts to the position shown in Figs. 1 and 2. The condensers may now be operated until the desired station has been selected, after which if the volume is to be controlled further the knob 72 is again depressed to control the volume. When the condenser rotor plates are turned, however, the indicator or pointer 66 is also turned due to the fact that the clutch connection is again re-established between the members 54 and 56. The gears in the housing 48 are speed reducing so that for several rotations of the shaft 53 the pointer 66 will move only a relatively short distance. This movement may be exactly the same as the movement of the condenser rotor plates, but I have found that it is preferable to employ a dial covering more than 180° while the condenser plates are, of course, moving only through approximately 180°. Gear ratios involved at either end of the flexible shaft are obviously a matter of expediency and other gear structures can be employed.

Figure 7:
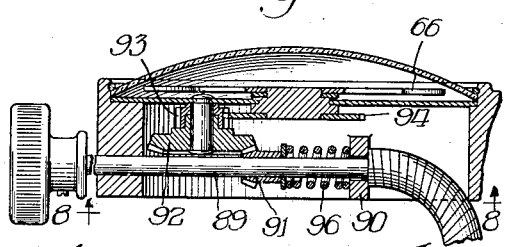
Fig. 7 is a sectional view similar to Fig. 4 but showing a modification.
Figure 8:
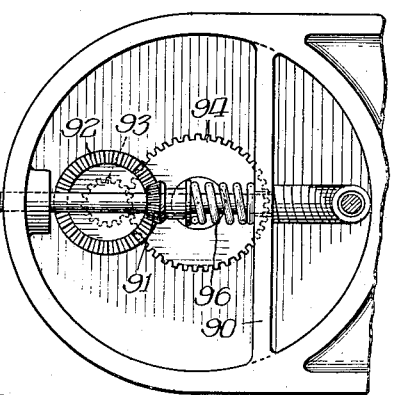
Fig. 8 is a sectional view looking upwardly on the line 8—8 of Fig. 7.

In Figs. 7 and 8, I show a modification of the invention. This modification concerns the portion of the device mounted on the steering post. In this form, the flexible shaft terminates in a shaft 89 supported transversely of the housing, being journaled partly in the housing and partly in a transverse web 90. The shaft carries a small beveled gear 91 which meshes with a larger beveled gear 92. The larger beveled gear has a spur gear 93 meshing with a relatively larger gear 94 mounted on a hub to which the pointer 66 is attached. The smaller beveled gear is normally held in engagement with the larger beveled gear by a compression spring 96, one end bearing against the hub of the gear and the opposite end against the web 90. In the position which the parts occupy in Figs. 7 and 8, the condensers will be tuned. If the volume is to be controlled or the main switch operated, the shaft 89 is pushed in a sufficient distance to disengage the gears and engage the clutch members 31 and 37. The spring 96 may be made strong enough so that this shaft will have to be held in its inner position, or the spring operation may be such as to permit the detent or pawl 41 exerting a holding action.

In the modification shown in Figs. 11, 12 and 13, the volume control and frequency selector are always connected, instead of separately connecting them with clutches as in the previous embodiment. In this form, longitudinal movement of the flexible shaft is effective to control one of the controllable elements, preferably the volume control, while the rotary movement of the shaft is utilized to select the station.

Referring now to Figs. 11 and 12, the flexible shaft 101 terminates in a straight shaft 102 suitably journaled and being keyed to a worm 103 meshing with the worm gear 104. The worm 103 is journaled in brackets 106 and being keyed to the shaft 102 may be turned by rotating such shaft independent of the longitudinal position thereof.

At the end of the shaft 102, a lever 107 is pivoted with a slot 109 through which a pin 111 carried by a bifurcated end of the shaft 102 engages. This provides for a shiftable pivot between the shaft and the arm 107 whereby the arm can be rotated about its pivot without binding. The end of the arm 107 is provided with a gear segment 112 meshing with a pinion 113 carried on the volume control shaft 114. The numeral 116 indicates generally the volume control which may be identical with the volume control described in connection with the preceding embodiment.

At the opposite end of the flexible shaft an indicating means and locking means substantially similar to that described in the preceding embodiment is provided. The shaft, however, is in engagement with the dial indicator at all times. Referring to this figure, the flexible shaft has an inflexible portion 117 provided with a keyway 118 into which keys 119 engage. These keys are carried by a sleeve 121 which is integral with a pinion 122 and which pinion through a gear train as shown moves a pointer 123 over a dial 124. A hand piece 126 is provided for the control of the flexible shaft.

In the operation of the embodiment of Figs. 11 to 13, the condenser or other station selector is turned independent of the longitudinal position of the flexible shaft and in any such position the frequency selected also will be indicated by the pointer 123. Similarly, at any position of this pointer the flexible shaft may be moved longitudinally to control the volume. It will be understood that although I show the volume controlled by longitudinal movement of the shaft and the station selected by the rotary movement thereof, these two movements may be interchanged or other suitable combinations thereof employed while still utilizing the principle of the present invention. The embodiment of Figs. 11 to 13, inclusive, it will be noted, permits the operator to vary the volume during the tuning; in other words, both rotary and endwise movement can be imparted to the flexible shaft at the same time. In any embodiment of the present invention, the volume can be controlled without affecting the tuning control and vice versa.

I have shown the device employed to operate the usual control mechanism on an ordinary conventional radio receiver. Tuning is usually accomplished by varying the capacity of a variable condenser. It will be understood, however, that I may control any tuning mechanism and operate any suitable type of switch. Furthermore, although I show only two pairs of clutch members in the present embodiment, it will be understood that I can employ additional clutch members and control additional mechanism in the receiver. Nothing but structurel changes, for example, would be required to mount the volume control and main switch separately. Furthermore, I have referred to the device as adapted for controlling an automobile radio set from a distance. The invention may be used, however, in controlling radio sets under any conditions in which the set is at some distance from the operator. It may also be employed for controlling other types of devices in which substantially the same general problems are involved. It will be understood, therefore, that my invention is not limited to the specific form of the invention shown and described, nor to the specific application thereof.

What I claim as new and desire to protect by Letters Patent of the United States is:

1. In a radio receiver installation, a chassis, a frequency selector secured on the chassis having a rotatable shaft, a power control device having a rotatable shaft, a flexible shaft having one end disposed adjacent said two shafts, a pair of clutch members operably associated with one end of said flexible shaft, a pair of clutch members operably connected to the frequency selector shaft and power control shaft respectively, and means for moving the flexible shaft longitudinally to connect the same operably either to the condenser shaft or power control shaft whereby said conections are effected with only a relatively short longitudinal movement of said shaft, said flexible shaft being rotatable to rotate either of said shafts.

2. The combination defined in claim 1, including indicating means located near the remote end of said flexible shaft, and means for forming a connection between the flexible shaft and the indicating means only when said flexible shaft is operably connected to the frequency selector shaft.

3. In a radio receiver installation, a tuning member having a rotatable shaft, a power control device having a rotatable shaft, a flexible shaft having one end terminating near said shafts, a shaft forming a continuation of said flexible shaft and having a pair of clutch members secured thereto, a clutch member operably connected to the tuning shaft and aligned axially with one of said clutch members, a clutch member operably connected to the power control shaft in axial alignment with the second one of said first mentioned clutch members, and means for moving the flexible shaft longitudinally to connect the same through its clutch members with the clutch member associated with either of said shafts.

4. The combination defined in claim 3, including a plurality of ratchet members secured on said extension shaft, and a spring-pressed detent adapted to engage between said ratchet members to hold said extension shaft and flexible shaft in any position to which it is normally adjusted.

5. In a radio receiver installation, a chassis having a tuning member and a power control device, a remote control device including a flexible shaft having one end disposed at a distance from the chassis and the opposite end terminating near said chassis, means operated in response to longitudinal movement of the flexible shaft for engaging the shaft with either the tuning member or the power control device, means for actuating either said tuning member or power control member in response to turning movement of the flexible shaft whereby electrical connection to said remove control device is obviated, a dial for the tuning member but forming part of the remote control device and operable responsive to movement of the flexible shaft when connected with the tuning member, means for preventing movement of the dial when the flexible shaft is connected for operating the power control device, and means for interconnecting said dial and flexible shaft only when said shaft is in operable communication with the tuning member.

6. In a radio receiver installation, a chassis having a tuning member and a power control device, a remote control mechanism including a flexible shaft, a frame member including a housing adapted to be secured to the steering post of an automobile, a dial secured to said housing, a pointer adapted to co-operate with the dial to indicate the frequency to which the receiver is tuned, a clutch member operably connected to said pointer, a second clutch member carried by the flexible shaft, means for moving said flexible shaft longitudinally to separate said clutch members, means for operably connecting the flexible shaft to the tuning member when said clutch members are connected, and means for operably connecting said flexible shaft to the power control device when said two clutch members are disconnected.

7. The combination defined in claim 6, including speed reducing mechanism between said flexible shaft and said pointer and speed reducing mechanism between said flexible shaft and said tuning member.

8. In a radio receiver installation, a flexible shaft, an extension of said flexible shaft, a worm rotatably supported around said shaft extension, a tuning shaft, a gear segment carried by said tuning shaft and engaged by said worm, a power control device having a shaft in axial alignment with said extension shaft but separated from said worm, a clutch member carried by said power control shaft, a clutch member carried by said worm, a pair of clutch members one for each of said first mentioned clutch members and carried by said extension shaft, whereby longitudinal movement of said flexible shaft is effective to connect the same operably either to said power control shaft or tuning shaft and whereby rotatory movement of said flexible shaft is effective to turn either of said shafts.

9. The combination defined in claim 8 including a ratchet device carried by said extension shaft between the two clutch members, with a pair of V-shaped annular grooves and an annular toothed projection between said grooves, and a spring pressed pointed pawl adapted to engage in either of said grooves to hold either pair of clutch members in engagement, said toothed projection and pointed pawl being effective to throw the extension shaft in either direction to effect a connection with one of said clutches should the shaft be turned when neither clutch is fully engaged.

10. The combination defined in claim 8 including an indicating device at the opposite end of the flexible shaft, and means for operably connecting said indicating device to said flexible shaft only when said flexible shaft is in operable connection with said tuning shaft.

11. In a remote control device for an automobile radio set, a remote control member having a portion conforming generally to the shape of an automobile steering post, a strap surrounding the steering post, connections between the ends of the strap and said remote control member, means for adjusting one end of the strap to preliminarily adjust the length of the strap to said post, and eccentric means at the other end of the strap for tightening the same about said steering post.

12. In a radio receiver installation, a chassis having an adjustable tuning member and a rotatable shaft, a control device having a rotatable shaft, a remote control device including a flexible shaft, clutch mechanism for engaging the flexible shaft with either the tuning shaft or control shaft, a tuning indicating mechanism forming a part of the remote control, means at the remote control for imparting either longitudinal movement to the flexible shaft to operate said clutch, or rotatable movement to turn said shaft, and means for inter-engaging the flexible shaft and tuning indicating device only when said flexible shaft is in engagement with the tuning shaft.

13. In a remote control device for an automobile radio set, a remote control member having a portion conforming generally to the curvature of an automobile steering post, a strap surrounding the steering post and having both ends connected to the remote control member, and an eccentric member carried by said remote control portion and engaging one end of the strap, and adapted to be rotated to tension said strap about said post.

DONALD H. MITCHELL.